(12) United States Patent
Maus et al.

(10) Patent No.: US 9,840,958 B2
(45) Date of Patent: *Dec. 12, 2017

(54) APPARATUS HAVING A TANK AND A DELIVERY UNIT FOR REDUCING AGENT

(75) Inventors: Wolfgang Maus, Bergisch Gladbach (DE); Ludwig Wieres, Overath (DE); Jan Hodgson, Troisdorf (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 882 days.

This patent is subject to a terminal disclaimer.

(21) Appl. No.: 13/548,607

(22) Filed: Jul. 13, 2012

(65) Prior Publication Data

US 2012/0321525 A1    Dec. 20, 2012

Related U.S. Application Data

(63) Continuation of application No. PCT/EP2011/050194, filed on Jan. 8, 2011.

(30) Foreign Application Priority Data

Jan. 13, 2010 (DE) .................. 10 2010 004 612

(51) Int. Cl.
  *F24H 1/20* (2006.01)
  *F01N 3/20* (2006.01)

(52) U.S. Cl.
  CPC ........ *F01N 3/2066* (2013.01); *F01N 2610/10* (2013.01); *F01N 2610/1406* (2013.01); *F01N 2610/1433* (2013.01); *F01N 2610/1466* (2013.01); *F01N 2610/1486* (2013.01); *Y02T 10/24* (2013.01)

(58) Field of Classification Search
  CPC .................. B60H 1/22; F01N 2610/10; F01N 2610/1406; F01N 2610/1433; F01N 2610/1466; F01N 2610/1486; F01N 3/10; Y02T 10/24
  USPC .......... 392/447; 60/274, 286, 295, 301, 303; 220/4.14, 501; 222/146.5, 189.08
  See application file for complete search history.

(56) References Cited

U.S. PATENT DOCUMENTS

| | | | | |
|---|---|---|---|---|
| 4,050,424 A | * | 9/1977 | Nelson | 261/39.3 |
| 4,292,499 A | * | 9/1981 | Kleinschmidt et al. | 392/480 |
| 4,387,291 A | * | 6/1983 | Keppel | 219/206 |
| 4,401,879 A | * | 8/1983 | Shukla et al. | 219/206 |
| 4,419,564 A | * | 12/1983 | Marcoux | 219/206 |
| 4,852,761 A | * | 8/1989 | Turner et al. | 220/746 |
| 5,243,818 A | * | 9/1993 | Schatz | 60/274 |

(Continued)

FOREIGN PATENT DOCUMENTS

| | | |
|---|---|---|
| CN | 101523022 A | 9/2009 |
| DE | 198 56 366 C1 | 4/2000 |

(Continued)

OTHER PUBLICATIONS

International Search Report of PCT/EP2011/050194.

*Primary Examiner* — Thor Campbell
(74) *Attorney, Agent, or Firm* — Laurence A. Greenberg; Werner H. Stemer; Ralph E. Locher

(57) ABSTRACT

An apparatus includes at least one tank having a tank bottom and a delivery unit for a liquid. The delivery unit is disposed in a chamber on the tank bottom and the chamber has at least one heater.

17 Claims, 6 Drawing Sheets

(56) References Cited

U.S. PATENT DOCUMENTS

| | | | |
|---|---|---|---|
| 5,642,695 A * | 7/1997 | Spies et al. | 123/142.5 E |
| 5,768,908 A * | 6/1998 | Tanaka et al. | 62/332 |
| 6,065,452 A | 5/2000 | Yoshioka | |
| 6,192,677 B1 | 2/2001 | Tost | |
| 6,527,548 B1 * | 3/2003 | Kushch et al. | 432/222 |
| 7,017,336 B2 * | 3/2006 | Stiermann | 60/286 |
| 7,165,615 B2 * | 1/2007 | Vinegar et al. | 166/302 |
| 8,184,964 B2 | 5/2012 | Haeberer et al. | |
| 8,429,900 B2 | 4/2013 | Knetsch et al. | |
| 8,448,426 B2 | 5/2013 | Peucat et al. | |
| 8,683,782 B2 | 4/2014 | Op De Beeck et al. | |
| 8,850,797 B2 | 10/2014 | Dougnier et al. | |
| 2003/0095795 A1 * | 5/2003 | Birdsell et al. | 392/365 |
| 2005/0022515 A1 * | 2/2005 | Stiermann | 60/286 |
| 2007/0157602 A1 | 7/2007 | Gschwind | |
| 2008/0052984 A1 * | 3/2008 | O'Rear | 44/389 |
| 2008/0092527 A1 * | 4/2008 | Ripper et al. | 60/286 |
| 2009/0025373 A1 * | 1/2009 | Buerglin et al. | 60/287 |
| 2009/0245764 A1 * | 10/2009 | Gagnon | 392/436 |
| 2009/0293460 A1 * | 12/2009 | Hirata et al. | 60/286 |
| 2010/0050606 A1 | 3/2010 | Fulks et al. | |
| 2010/0146940 A1 * | 6/2010 | Goulette et al. | 60/286 |
| 2010/0154907 A1 | 6/2010 | Lecea et al. | |
| 2012/0315196 A1 | 12/2012 | Maus et al. | |

FOREIGN PATENT DOCUMENTS

| | | |
|---|---|---|
| DE | 10 2006 017 471 A1 | 12/2007 |
| DE | 10 2007 047 885 A1 | 6/2008 |
| DE | 102007000572 A1 | 7/2008 |
| EP | 1 043 495 A2 | 10/2000 |
| EP | 1 925 354 A1 | 5/2008 |
| EP | 2 161 422 A2 | 3/2010 |
| EP | 2 199 556 A2 | 6/2010 |
| JP | 2004324502 A | 11/2004 |
| JP | 2004324651 A | 11/2004 |
| JP | 3687914 A | 8/2005 |
| JP | 2006226282 A | 8/2006 |
| JP | 2008180110 A | 8/2008 |
| JP | 2009257122 A | 11/2009 |
| JP | 2009540184 A | 11/2009 |
| JP | 2013517412 A | 5/2013 |
| KR | 1020090026285 A | 3/2009 |
| WO | 9925975 A1 | 5/1999 |
| WO | 2009007405 A1 | 1/2009 |
| WO | 2009034175 A1 | 3/2009 |

* cited by examiner

APPARATUS HAVING A TANK AND A DELIVERY UNIT FOR REDUCING AGENT

CROSS-REFERENCE TO RELATED APPLICATION

This is a continuation, under 35 U.S.C. §120, of copending International Application No. PCT/EP2011/050194, filed Jan. 8, 2011, which designated the United States; this application also claims the priority, under 35 U.S.C. §119, of German Patent Application DE 10 2010 004 612.4, filed Jan. 13, 2010; the prior applications are herewith incorporated by reference in their entirety.

BACKGROUND OF THE INVENTION

Field of the Invention

The present invention relates to an apparatus including a tank having a tank bottom and a delivery unit for a liquid, wherein the liquid is, in particular, a liquid reducing agent for exhaust-gas aftertreatment.

In order to remove nitrogen oxides ($NO_x$) in the exhaust-gas flow of internal combustion engines, a liquid reducing agent is preferably injected into the exhaust-gas flow in order to convert the nitrogen oxides present in the exhaust-gas flow into elementary nitrogen ($N_2$) and water ($H_2O$) through the use of a catalytic converter. An active substance, for example ammonia ($NH_3$) and/or urea ($CH_4N_2O$), is preferably dissolved in water and added as a liquid reducing agent. In order to store the liquid reducing agent, a tank is provided which interacts with a delivery unit so that it is possible to deliver the reducing agent to the exhaust-gas flow from the tank.

A number of technical problems are associated with the delivery and storage of the reducing agent, in order to supply a predefined quantity of the reducing agent to the exhaust-gas flow under all operating conditions. Those problems are based, in particular, on the fact that the liquid reducing agent, in particular the aqueous urea solution, can freeze. In order to prevent the liquid reducing agent from freezing, it is possible to add, for example, antifreeze, with the result that the freezing point of the aqueous urea solution, which is usually about −11° C., is lowered to −40° C.

Even when such an antifreeze or freezing-point depressant is used, it must nevertheless be ensured that the nitrogen oxides in the exhaust-gas flow are reduced even at very low temperatures in the vicinity of the motor vehicle. For that purpose, it may be necessary first of all to thaw or melt the reducing agent. To that end, various configurations for heating the tank and/or a partial volume of the tank have already been proposed. However, those configurations are to some extent not suitable for carrying out repeated thawing and freezing in such a way that liquid reducing agent can be added reliably to the exhaust-gas flow.

Particular difficulties arise when the liquid reducing agent is extracted close to the tank bottom and through the tank bottom. In that case, it has been found, for example, that although the frozen reducing agent can be thawed through the use of a heater on the tank bottom, regions of the frozen liquid that are located thereabove cannot be reached, and therefore a thick shell of ice remains around the removal point. However, the extraction of the liquefied reducing agent by suction results in a vacuum, against which the pumps that are usually employed in that case cannot work.

SUMMARY OF THE INVENTION

It is accordingly an object of the invention to provide an apparatus having a tank and a delivery unit for reducing agent, which overcomes the hereinafore-mentioned disadvantages and at least partly solves the highlighted problems of the heretofore-known apparatuses of this general type.

In particular, it is intended to achieve the object of specifying a heating strategy or heat management, by way of which targeted and sufficient thawing of frozen reducing agent is already achieved shortly after starting. In this case, in particular a concentrated introduction of heat is to be desired, without local hot spots, which reach a surface temperature of greater than 90° C., being created in the process. Furthermore, if appropriate, safeguards which influence the functionality or the heating strategy in a targeted manner are intended to be proposed.

As a further object, it should be mentioned that measures which allow satisfactory removal of liquid reducing agent precisely during the thawing process or shortly after the thawing process so that, in particular, substantially bubble-free delivery is made possible, are intended to be specified.

Furthermore, it is an aim of this invention to improve the heat management close to the removal point and also the satisfactory removal of liquid reducing agent by way of a suitable return line of already delivered reducing agent to the tank.

A further object of the invention is to propose measures by way of which more precise knowledge is provided about the degree of thawing or the filling level of liquid reducing agent during the thawing process or shortly after the thawing process.

A further object is to specify measures by way of which the freezing process already proceeds in a targeted manner, so that the components of the tank or the tank itself is/are subjected to less loading and/or the thawing is subsequently facilitated.

In addition, it is intended to achieve heating of the tank in an advantageous manner in terms of energy, so that as little energy as possible has to be made available by a motor vehicle.

A further partial object is considered to be constructing the apparatus in such a way that it is easy to handle for inspection purposes and/or maintenance purposes. In particular, inspection and/or maintenance of the delivery unit is also intended to be possible when the tank has not been completely emptied.

Furthermore, specified measures are intended by way of which the formation of a vacuum during heating when the reducing agent is being removed is avoided. In this case, low technical complexity is intended to be implemented as far as possible.

With the foregoing and other objects in view there is provided, in accordance with the invention, an apparatus, comprising at least one tank having a tank bottom, a chamber disposed on the tank bottom, the chamber having at least one heater, and a delivery unit for a liquid, wherein the delivery unit is disposed in the chamber.

The tank can be embodied in principle with metal and/or plastics material. As a rule, the tank has a complex geometry because it is adapted to the circumstances or the spatial conditions in the motor vehicle. The tank can be produced in one piece, but this is not absolutely necessary. As a rule, the tank has a tank bottom, one or more tank sides and a tank top, which together define the tank interior or the tank volume. Of course, it is also possible for the tank to be subdivided into a plurality of partial volumes, so that (different) quantities of liquid can be stored in the different partial volumes.

The apparatus also has at least one delivery unit, with precisely one (individual) delivery unit being provided as a rule. In this case, the delivery unit includes components by way of which the liquid can be conveyed out of the tank (passive components such as liquid-conducting lines, for example, and active components such as devices for treating, converting, heating, etc. the liquid, for example). In this regard, the delivery unit includes preferably at least one pump and corresponding delivery lines for the liquid. Where necessary, it is possible for the delivery unit to have even further components, such as at least one filter, at least one sensor and/or at least one valve, for example. Electronic or electrical components can also be integrated into the delivery unit, for example circuits, memories, computers or the like.

A "liquid" is understood to mean, in particular, a substance which is in a liquid state of matter at least at room temperature. Very particularly preferably, the liquid is a reducing agent for the treatment of nitrogen oxides as occur in the exhaust gas of internal combustion engines. In addition, for example, to ammonia, a liquid reducing agent is also understood to be an ammonia precursor, such as urea, for example. The liquid reducing agent can additionally have at least one freezing-point depressing substance, and also small particles that do not hinder delivery. To this extent, "liquid" is a generic term, in particular for precisely these types of reducing agent.

The delivery unit of the apparatus according to the invention in this case is disposed in a chamber on the tank bottom. The chamber represents, in particular, an inwardly directed indentation, recess, setback or the like from the adjacent tank bottom. Thus, the chamber, starting from the tank bottom, forms a chamber height. The chamber is free of the liquid which is stored in the tank and at least partly accommodates the delivery unit. The chamber can alternatively also be filled or flooded at least partially likewise with the liquid stored in the tank. Thus, the displacement volume of the chamber in the tank can be reduced. The chamber can be an integral (one-piece) or separate attachment part of the tank bottom. It is also preferred for the chamber to be closed, preferably at the level of the adjacent tank bottom. It is furthermore preferred for the chamber to be disposed off-center with respect to the tank, i.e. close to one tank side.

Although the chamber extends preferably from the tank bottom, it is also possible for the chamber to be disposed on a side wall of the tank and to extend from the side wall of the tank. However, in this case, it is preferred for the chamber to be disposed in the vicinity of the tank bottom. In this case, there is proposed in particular a position which is located closer to the tank bottom than to the tank top. The distances of the chamber from a tank top and from a tank bottom can be determined, for example, through an imaginary center point of the chamber and the distance thereof from an imaginary plane of the tank top and the distance from an imaginary plane of the tank bottom. An imaginary plane of a tank top or of a tank bottom reproduces substantially the location or position of the tank top or of the tank bottom. Shapings or recesses in the tank bottom or tank top do not need to be taken into account in this case. Preferably, the distance of such an imaginary center point from the plane of the tank top is even more than twice as large and particularly preferably more than five times as large as the distance of the center point from the plane of the tank bottom.

It is also provided in this case that the chamber has at least one heater. In this case, it is very particularly preferred for the heater to be operated with electrical energy. The heater can in principle be embodied separately, be part of the delivery unit and/or be disposed in or on a chamber wall.

The configuration proposed herein has a number of advantages. The chamber projecting into the tank allows a space-saving configuration of the delivery unit. The closeness of the delivery unit to the bottom also allows the tank to be completely emptied of the liquid, irrespective of the construction of the tank, for example compared with tanks in which the liquid is removed through a delivery unit disposed on the tank top. Furthermore, the heater in the chamber projecting into the tank allows the heat to be introduced into the ice more deeply or further into the interior during thawing. Also, in this way, the heated surface area is locally increased. The preferred contour of the chamber with relatively steep chamber side walls (extending in practice almost perpendicular to the tank bottom) also leads to a directed flow of thawed reducing agent to a predefined region of the tank bottom, in such a way that a large quantity of the liquid can be thawed quickly in this case and transported to a removal point.

In accordance with another feature of the invention, the heater is embodied with at least one electrical heating segment which is disposed in heat-conducting contact at least with the chamber side wall or with the chamber top. It is very particularly preferred that in each case at least one electrical heating element is disposed on or in a chamber side wall and at least one electrical heating element is disposed on or in the chamber top. Preference is given to the use of an electrical heating line, such as a heating wire, a heating foil or the like as the electrical heating element. The heater can also have at least one heating element having a heating resistor with positive temperature coefficient. Such a heating element is also referred to as a PTC heating element (PTC=positive temperature coefficient). The heater can be printed on and/or adhesively bonded to the chamber wall, in particular from the inside of the chamber. It is also possible for the heater to be fastened to the chamber wall with a type of clamp. For example, a heater can be pressed against the outside and/or the inside of the chamber wall through the use of a clamp. An appropriate power source, which can be regulated, in particular in a targeted manner, is provided for operating the electrical heating segments of the heater.

In accordance with a further feature of the invention, in this context, it is particularly preferred for a plurality of heating segments to be provided in the direction of a height of the chamber. This means, in other words, that, starting from the tank bottom in the direction of the chamber top, there are provided a plurality of heating segments which extend, in particular, around the chamber and are disposed preferably parallel to one another. These heating segments can be operated or regulated, in particular, independently of one another. In addition, it is also possible for these heating segments to be embodied in different ways, in particular with regard to the individual heating power thereof. In this case, it is very particularly preferred for the potential heating line of the heating segments to decrease from bottom to top in the direction of the chamber height. This also means, in other words, that a heating segment which is disposed close to the tank bottom allows more heat to be introduced into the tank interior than a heating segment which is disposed closer to the chamber top.

In accordance with an added feature of the invention, insulation is provided at least in the region of a top of the chamber. It is very particularly preferred in this case that the thermal insulation be positioned between a chamber wall having a heater and the chamber interior having the delivery unit. If appropriate, the entire region adjacent a heater towards the interior of the chamber or the delivery unit can be embodied with one or more thermal insulation devices. It is also very particularly preferred that the chamber has no insulation opposite the chamber top towards the environment. What is intended to be achieved thereby is, in particular, that the heat which is provided by the at least one heater is introduced directly to the liquid in the tank adjacent the chamber and not, or in a much reduced manner, to the interior of the chamber or the delivery unit. Furthermore, in this way it is possible in the event of cold acting from the outside for the delivery unit to freeze first, but not the liquid in the immediate vicinity of the thermally insulated chamber wall. This ensures reliable operation of the apparatus even in the event of long-term action of cold at the removal point, and also rapid thawing of liquid in the event of freezing, with the thawing being advantageous in terms of energy. The thermal insulation has, in particular, lower thermal conductivity than metal or plastics material. Preferably, the thermal insulation includes at least ceramic or an open-cell foam.

In accordance with an additional feature of the invention, the heater includes at least one self-regulating heating segment. This means, in particular, that (automatic) monitoring and regulation takes place, and that a predefined temperature in the region of contact with the chamber towards the liquid is not exceeded. In this case, the heating power can be configured in such a way that at a temperature of the liquid of about 0° C., a maximum surface temperature of the chamber wall (e.g. 90° C. or even only 70° C.) is not exceeded even in regions where, for example, no significant liquid proportion is present during the thawing process. For this purpose, use can be made, for example, of a heating material which undergoes a temperature-dependent (electrical) change in resistance and thus regulates the heating power itself as a result of the change in resistance. In this context, a PTC heating element is self-regulating. A further possibility of forming a self-regulating heating element is provided by a bimetallic switch. A bimetallic switch is formed from two different materials having different coefficients of thermal expansion. A bimetallic switch can be formed in such a way that it disconnects an electrical connection as soon as a temperature is above a threshold temperature. Such a bimetallic switch can be provided in the heater in order to regulate the heater automatically to a predefined heating temperature. For a self-regulating heating element, it is also possible to provide a separate control unit, formed of a temperature sensor, a regulator and a variable resistor, within the heating element.

If appropriate, additional switches, in particular so-called thermostatic switches, can also be provided in order to carry out two-point regulation for the individual heating segments.

In accordance with yet another feature of the invention, the at least one heater is constructed as a filling level gauge. This applies, in particular, for the case in which the heater is embodied with a heating material which has a temperature-dependent electrical resistance. As a result of the contact of the heater with the environment towards the tank, different temperatures can be determined at different heights in the chamber, and thus information about the degree of liquid or the height of the liquid level around the chamber can be obtained precisely for the thawing time period. This relates, in particular, also to the state in which large parts of the liquid in the tank are still frozen, for example also where a filling level gauge for the entire tank is possibly provided. Use can be made in this case, in particular, of energy analysis to determine the filling level or the liquid level. The amount of energy required to heat the contents of the tank is proportional to the filling quantity, at least in a particular temperature range. Therefore, it is possible to conclude the filling height in the tank from the amount of heating energy introduced into the tank.

The specific heat capacity of the liquid in the tank is usually also dependent on the state of matter of the liquid. Frozen water has, for example, a specific heat capacity of 2.06 kJ/(kg K) [kilojoules per kilogram and Kelvin]. Liquid water has a specific heat capacity of 4.19 kJ/(kg K) [kilojoules per kilogram and Kelvin]. Urea/water solution, which is often used as reducing agent, has comparable heat capacities in the corresponding states of matter. Therefore, in order to heat up the liquid in the frozen state or to heat up the liquid in the liquid state, different amounts of energy are required. This can be used to determine the state of matter of the filling of the tank in the context of an energy analysis.

In order to improve and monitor the energy analyses, it is also possible to fit conductor tracks as additional temperature sensors in the tank and/or on the chamber. The temperature signals from these temperature sensors can also be taken into consideration in an energy analysis.

According to one development of the invention, the heater can also include a coolant heater. A coolant heater can be configured in the manner of a cooling coil through which the coolant of an engine flows. Such a cooling coil can be provided on the chamber wall inside and/or outside the chamber.

In accordance with yet a further feature of the invention, at least one heat-conducting device can be disposed on the tank bottom, close to the chamber. This means, in particular, that the heating power generated with the chamber is introduced through (passive) heat-conducting devices into the (adjacent or adjoining) environment of the chamber, specifically into the tank bottom located there. For this purpose, separate and/or integrated heat-conducting devices can be provided at or in the tank bottom. A heat-conducting device can, in particular, be a metal ring cast into the tank bottom (e.g. a so-called SAE connector) and/or a (integrally cast or one-piece) pot or a (integrally cast or one-piece) sleeve, which forms or at least partly bounds a kind of depression or trench around the chamber. Of course, it is likewise possible to provide the heat-conducting device on the chamber wall and to distribute the heating power generated by the heater (also) through the surface of the chamber to the tank interior. The heat-conducting devices are formed preferably with metal material.

In accordance with yet an added feature of the invention, preference is also given to an embodiment in which the heat-conducting device serves to fasten the chamber.

Thus, the heat-conducting devices can at the same time be a part of or the entire chamber fastening device, in such a way that a simple embodiment of the chamber fastening device and the heat-conducting device can be achieved.

In accordance with yet an additional feature of the invention, a discharge line for liquid from the tank into the chamber and a return line for liquid from the chamber into the tank are provided, wherein the discharge line and return line are disposed at different positions in the chamber. Very particularly preferably, the discharge line is disposed at a lower geodetic height than the return line. It is regarded very particularly as advantageous that the discharge line is disposed close to the tank bottom while the return line is disposed on a chamber side wall opposite the discharge line and/or, as is very particularly preferred, on the chamber top. With such a configuration of the discharge line and the return line, it can be ensured that air bubbles, which may be introduced back into the tank through the return line, are not directly drawn in again by the discharge line. Furthermore, in this way, it is possible for the already delivered liquid which is thus also heated as a rule to be supplied to other regions of the tank, in that ice is still to be expected during the thawing process. For this purpose, the return line can be embodied with a small tube that extends to close to the chamber top, a nozzle or the like. In addition, baffle structures can be formed on the chamber wall, in particular on the chamber top, by way of which baffle structures the liquid returned through the return line runs, in particular uniformly, in a targeted manner along the chamber wall and thus can be supplied quickly and in a bubble-free manner back to a liquid reservoir close to the discharge line. Even though an individual discharge line and return line are always referred to herein, the number thereof can be varied in such a way that, for example, a plurality of return lines are provided. Furthermore, it is noted that a blocking device can also (jointly) affect a plurality of components or fluid lines.

However, it can also be advantageous for the discharge line and the return line to be located directly together. However, then the return line is advantageously disposed above the discharge line, in order that air bubbles, which pass out of the return line, do not come into contact, as far as possible, with the discharge line. In such a configuration, possibly only one opening is necessary in the chamber wall for the discharge line and return line to pass through. Thus, the number of necessary seals can be reduced.

In accordance with again another feature of the invention, at least the discharge line or the return line has a drain block. Very particularly preferably, both the discharge line and the return line have a drain block. A drain block can be embodied with an electric actuating unit (e.g. valve, etc.) and/or a mechanical actuating unit (flap, spring system, etc.). The drain block in this case is formed in such a way that when the drain block is activated liquid is prevented from running through the discharge line and/or return line. This relates, in particular, to the case in which the delivery unit is taken out of the chamber or is removed with the chamber from the tank, for example for inspection purposes or for maintenance. Such a drain block accordingly makes it impossible for the liquid still present in the tank to run out when or after the delivery unit is removed. Very particularly preferably, the drain block interacts with at least one component of the delivery unit and/or the chamber wall, in such a way that in the fitted state of the delivery unit or of the chamber, the drain block is automatically open and automatically closes upon removal.

In accordance with a concomitant feature of the invention, the tank has at least one local ventilation heater which extends, starting from a discharge line for liquid starting at the tank bottom, through at least one tank side as far as the vicinity of a tank top. The ventilation heater is, in particular, oriented or configured in such a way that it forms at least one channel at the tank boundary when the liquid in the tank is frozen. Thus, the ventilation heater supplies heat to the frozen liquid in such a way that a continuous region is formed in a substantially uninterrupted manner by way of a locally concentrated introduction of heat. This ventilation heater extends in this case, starting from the discharge line for liquid at the tank bottom, continuously as far as a tank side along the tank bottom and then along the tank sides as far as the vicinity of the tank top. This means, in particular, that the ventilation heater extends over at least 50% of the height of the tank side, preferably even over at least 80% and very preferably up to the maximum filling level of the liquid in the tank. In this way, a connection (through which a gas can flow) between the gas volume, located above the liquid, in the tank and the discharge line is realized in a reliable manner by way of the ventilation heater, and so the formation of a vacuum in the region of the discharge line or of the chamber is precisely prevented. In principle, it is possible for a (separate) ventilation heater to be provided specifically for this purpose, but it is also possible to heat, for example, an extensive heater of the tank locally, that is to say in a region, which, with respect to the tank side, is small, precisely defined and delimited, to a particular degree (in a targeted or separate manner).

In this connection, it is also regarded as advantageous that the at least one local ventilation heater is disposed in a linear manner in a guide in the tank. To this end, it is possible for a groove to be provided externally and/or internally on or in the tank boundary (tank bottom, tank side). The groove can be fitted as a separate component to the tank bottom or the tank side, but an integrated, integral or one-piece configuration is preferred. It is very particularly preferred for the guide to already be formed at the same time as the tank is produced. In the event that the guide is formed towards the interior of the tank, it can optionally serve (in part) as a boundary for the channel to be formed and/or as a protection for pieces of ice floating around. In the event that a guide is provided externally on the tank, it can serve for securing the heater. The guide represents, in particular, a partial enclosure for the ventilation heater.

Furthermore, it is regarded as particularly advantageous that the at least one local ventilation heater is formed at least partly with a heated injection line which extends from the delivery unit to an injector for the liquid. Precisely in the field of application of the invention, during the reduction of nitrogen oxides in exhaust gases of mobile internal combustion engines, the liquid or the reducing agent is heated during delivery to an injector. For this purpose, use is optionally made of pipes and/or hoses, which have electrical heaters. It is proposed herein to place this heated injection line in heat-conducting contact with the tank, in such a way that the heat generated there is also emitted to the tank bottom and/or the tank side. If appropriate, to this end, the thermal insulation device of the heated injection line should be removed, at least in part, in order that heat can also be emitted to a significant extent to the liquid located in the tank. Alternatively, or in addition, the heated injection line can be configured in such a way that it has at least two subregions which have different heat transfer coefficients. This can be done, for example, by the formation of subregions having different thermal insulation. Particular preference is given in this case to an embodiment in which a first subregion having a first heat transfer coefficient is disposed on the tank while a second subregion, which is not disposed on the tank, has a second heat transfer coefficient which is lower than the first heat transfer coefficient. In principle, it is possible for the heated injection line to be guided through the interior of the tank, but preference is given to an embodiment in which the heated injection line is fixed in an externally disposed guide. In the first case, the first subregion of the heated injection line is preferably that subregion which is guided through the interior of the tank, while the second subregion of the heated injection line is that subregion which is located outside the tank.

Preference is given to an embodiment in which there is provided thermal insulation which is connected to a cover by way of which the guide is releasably closeable.

This advantageously allows an embodiment in which the heat transfer towards the outside is less as a result of the thermal insulation than the heat transfer into the tank. Due to the releasable closeability, the guide, and the components accommodated therein, is easily accessible for inspection or maintenance.

Furthermore, it is also possible to form the at least one local ventilation heater at least in part with a device for fastening the tank to a motor vehicle. When such apparatuses are secured to a motor vehicle, use is made for example of so-called tensioning straps, which partially abut the outside of the tank. Such tensioning straps can also be configured with a heater, and introduce heat into the interior of the tank by way of their abutment. Thus, these components can also be used to form at least one such ventilation heater having a local action for the targeted shaping of channels close to the tank boundary.

The preferred field of application of the present invention is an apparatus in the form of an apparatus for providing reducing agent for motor vehicles having an internal combustion engine, which emits exhaust gas into an exhaust gas system. The apparatus for providing reducing agent in this case is integrated into the motor vehicle, in that the tank is fastened to the motor vehicle. The apparatus for providing reducing agent is constructed, in particular with the use of an appropriate control device, to supply reducing agent as required to the exhaust gas system.

Other features which are considered as characteristic for the invention are set forth in the appended claims, noting that the features recited individually in the claims can be combined with one another as desired in a technically sensible manner and disclose further embodiments of the invention.

Although the invention is illustrated and described herein as embodied in an apparatus having a tank and a delivery unit for reducing agent, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
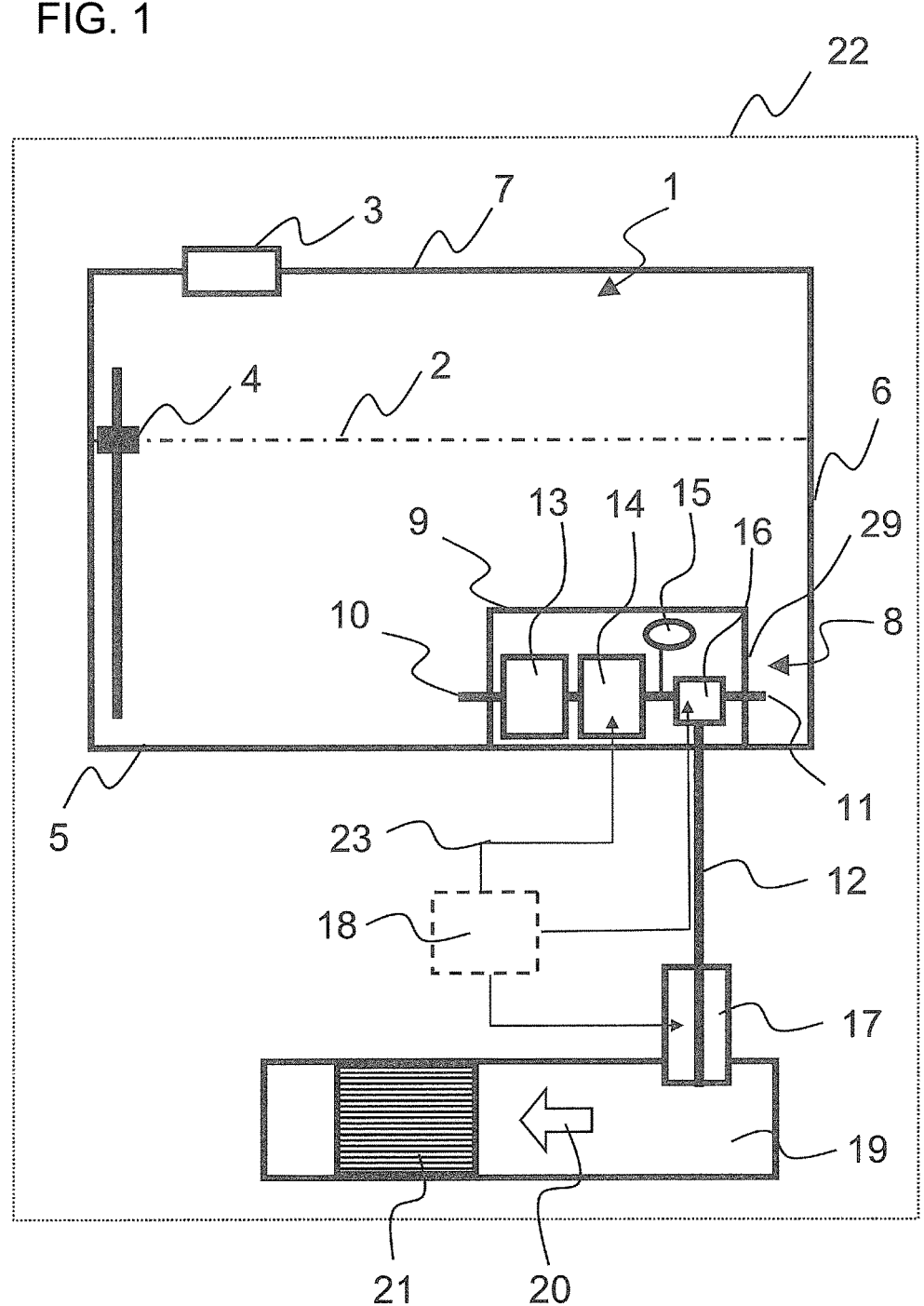
FIG. 1 is a diagrammatic, vertical-sectional view of an apparatus having a tank and a delivery unit in a motor vehicle.

Referring now to the figures of the drawings in detail and first, particularly, to FIG. 1 thereof, there is seen a diagrammatic illustration of a motor vehicle 22 having a tank 1 for storing a liquid 2, in particular for storing liquid reducing agent, such as an aqueous urea solution. The tank 1 forms an interior with its boundary walls, which are formed in this case by an upper tank top 7, a tank bottom 5 disposed below and tank sides 6 located in between. The tank 1 illustrated therein additionally has in its tank top 7 a filling opening 3, through which the tank 1 can be filled as required with liquid 2. It is also conventional for such a tank 1 to have one or more filling level gauges 4, by way of which the current filling level of the liquid 2 in the tank 1 can be determined.

A delivery unit 8 is disposed in a chamber 9 formed off-center on the tank bottom 5. There is no liquid 2 in the chamber 9, but rather components for delivering the liquid 2 from the tank 1 to an injector 17 are disposed there. In this case, the delivery unit 8 takes liquid 2 from inside the tank 1 through a discharge line 10, which is likewise disposed close to the tank bottom 5. The delivery unit 8 includes (in a through-flow order given in this case, starting from the discharge line 10) first of all a filter 13, then a pump 14 and a valve 16, by way of which the liquid is passed to the injector 17. A sensor 15, in particular a pressure sensor or a temperature sensor or a combination of a pressure sensor and a temperature sensor, can be provided in a line section between the pump 14 and the valve 16. As an alternative to passing on the liquid 2 to an injector 17, the valve 16 also allows delivery to a return line 11, through which the liquid 2 is supplied back to the tank 1 and consequently exits the chamber 9 back into the tank.

In order to operate the pump 14, the valve 16, the injector 17 and/or further components, a controller 18 can be provided, which is connected to the components by way of signal conductors 23. In addition, the controller 18 can be connected to different sensors and/or superordinate controllers (such as an engine controller, for example), in order to start delivery or heating as required. The controller 18 can likewise be integrated in the chamber 9. The liquid 2 delivered by the delivery unit 8 is supplied through the injector 17 to an exhaust gas line 19, through which the exhaust gas flows in a predefined flow direction 20. In this case, evaporation (e.g. thermophoresis) or conversion (e.g. hydrolysis) of the liquid 2 to a reducing agent for nitrogen oxides can take place, if appropriate, with the aid of catalytically active substances. This mixture of reducing agent and exhaust gas can then be supplied to an exhaust-gas treatment unit 21, in particular a catalytic converter, so that the nitrogen oxides in the exhaust gas line 19 are reduced. The liquid 2 is preferably added in this case while taking into account the quantity of liquid 2 required in the exhaust gas line 19.

Figure 2:
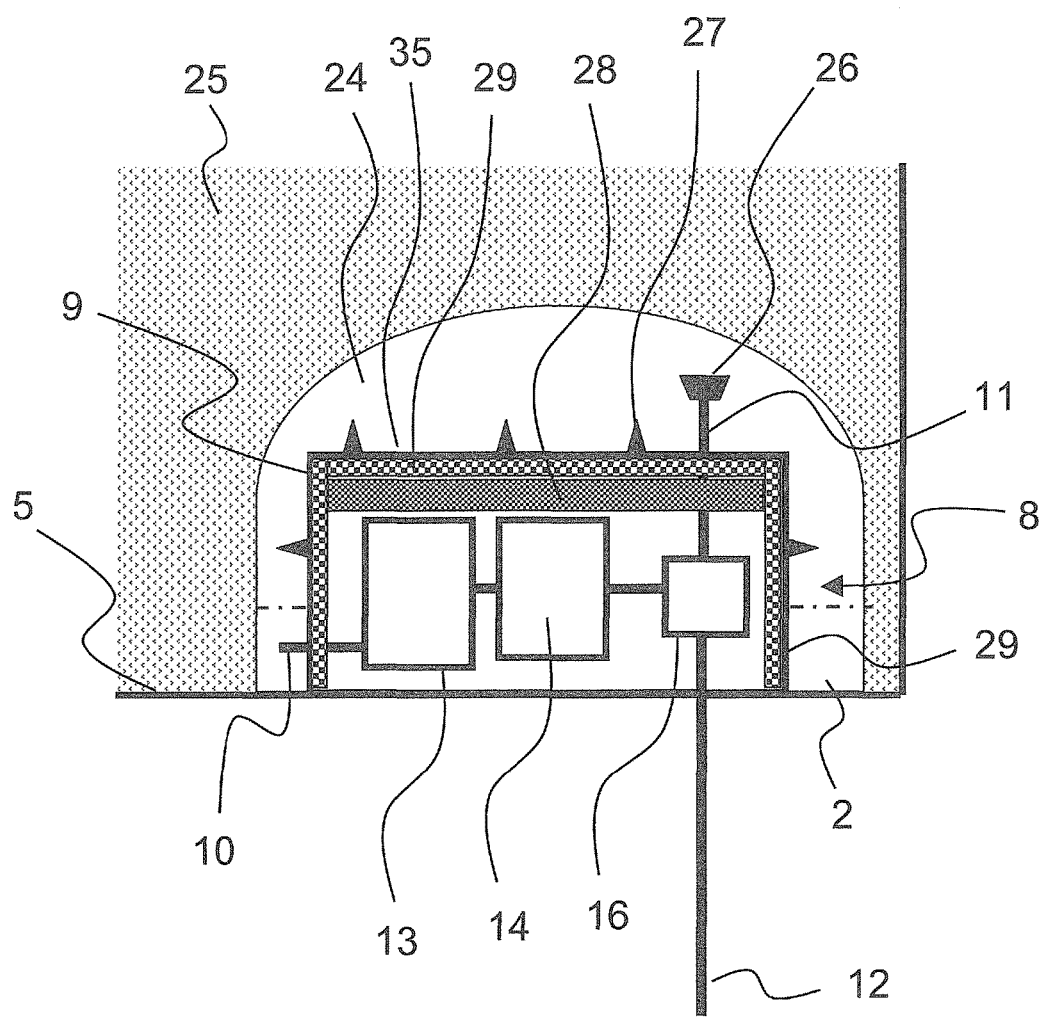
FIG. 2 is an enlarged, fragmentary, vertical-sectional view of a portion of an apparatus having a partially insulated chamber.

FIG. 2 shows a portion of a tank, with particular focus being placed on the construction of the chamber 9. Illustrated therein is a state of the tank 1 in which the liquid is predominantly frozen and a thawing process has already taken place to some extent. Accordingly, a space 24 is formed around the chamber 9 and that space 24 is surrounded by frozen liquid 25. A thawed or melted partial volume of the liquid 2 collects around the chamber 9, in the vicinity of the tank bottom 5. In this case, the chamber 9 is formed in such a way that the discharge line 10 is disposed close to the tank bottom 5, that is to say in the region of the liquid 2. In contrast, the return line 11 is disposed above the liquid 2 and additionally has in this case a distributor 26, for example in the form of a nozzle. The already heated partial volume of liquid 2 discharged through the return line 11 now wets the wall of the space 24 or the boundary of the frozen liquid 25 and thus improves the emission of heat to the frozen liquid 25. In addition, baffle structures 27, by way of which it is possible to set the drain of thawed liquid 2 over the chamber 9, are disposed on the chamber wall.

Inside the chamber 9, in addition to the components for delivering the liquid 2, namely the filter 13, pump 14 and valve 16, there is provided a heater 29, which is disposed in heat-conducting contact on the walls of the chamber 9. This heater 29 is preferably an electrical heater. The heater 29 can be activated as required and can supply the region around the chamber 9 with heat. It is also illustrated therein that thermal insulation 28 that is directed towards the interior of the chamber 9 and covers the heater 29, is provided for the heater 29 on a top 35 of the chamber. It is also possible to provide thermal insulation in the same way towards the chamber side walls or the heater 29 disposed there. The thermal insulation 28 is intended, in particular, to ensure that the chamber wall is thermally decoupled from the interior of the chamber 9, in particular the components disposed there and/or a base plate located underneath. As a result, the lines with liquid inside the chamber 9 freeze first and the region around the chamber 9 in the tank interior delays the freezing of the liquid 2 as long as possible.

Figure 3A:
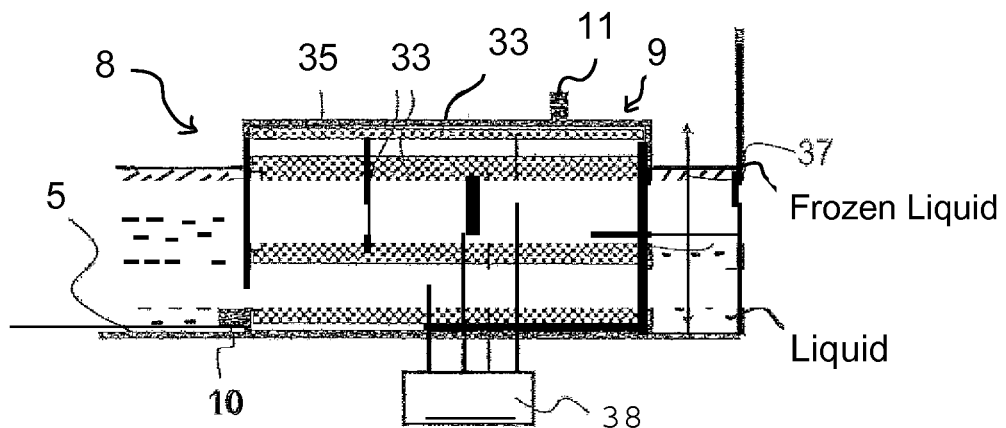
FIGS. 3A and 3B are each vertical-sectional views of a chamber having a plurality of heating segments showing different levels of liquid in the tank.
Figure 3B:
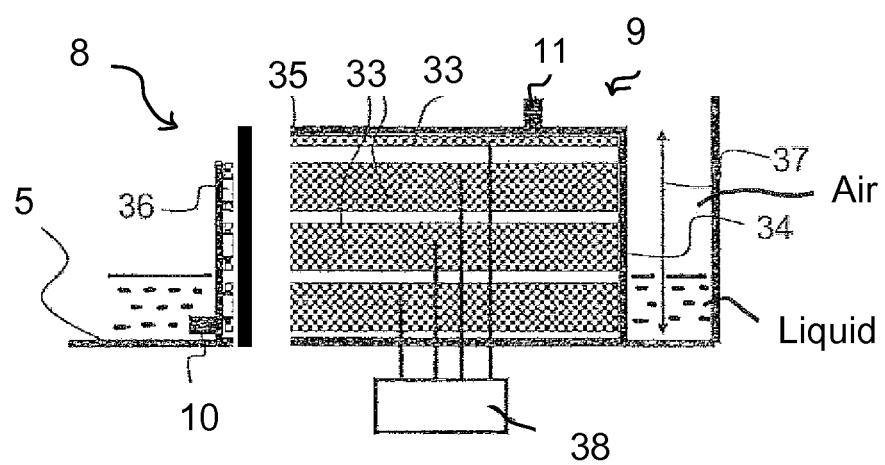
Figure 3:
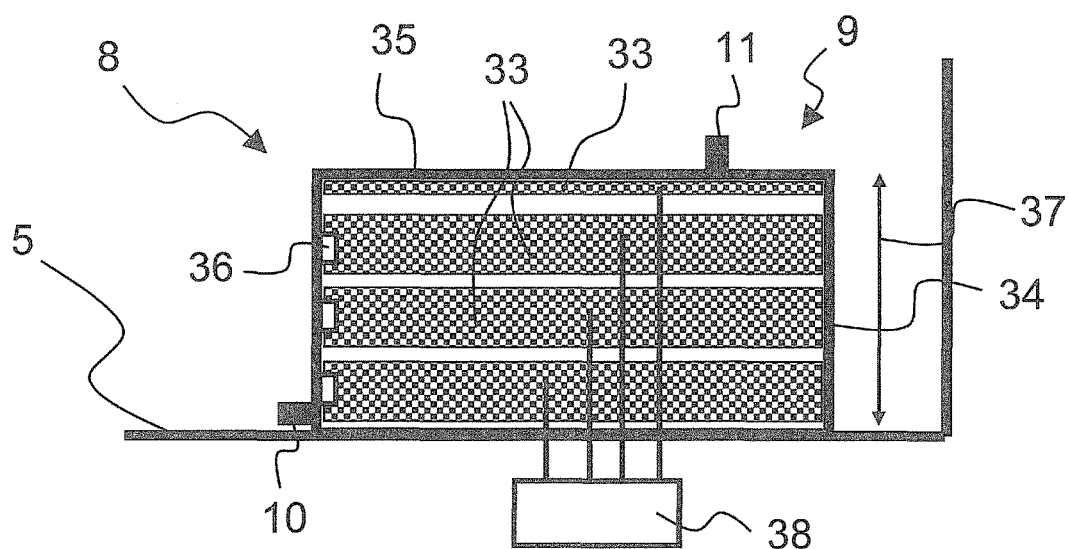
FIG. 3 is a vertical-sectional view of a chamber having a plurality of heating segments.

FIG. 3 illustrates, without showing the components of the delivery unit 8, how the heater 29 on the chamber walls can be embodied. In this case, it is shown in particular, that the heater 29 has a plurality of heating segments 33 (or heating elements), which are disposed parallel to and/or in a manner spaced apart from one another over a chamber height 37. In this case, three heating segments extend peripherally along a chamber side wall 34, and a planar electrical heating element 33 is provided on the chamber top 35. The three heating segments 33 disposed over the chamber height 37 on the chamber side wall 34 are embodied as self-regulating heating elements and they are simultaneously constructed to function as filling level gauges. For this purpose, the heating segments 33 are connected not only to a controller but also to a power supply 38, so that a targeted power supply as required, or a targeted determination of electrical resistance as required, is possible. In addition, switches 36, in particular so-called thermostatic switches, can be provided in order to limit the heating action of these heating segments 33.

Figure 4:
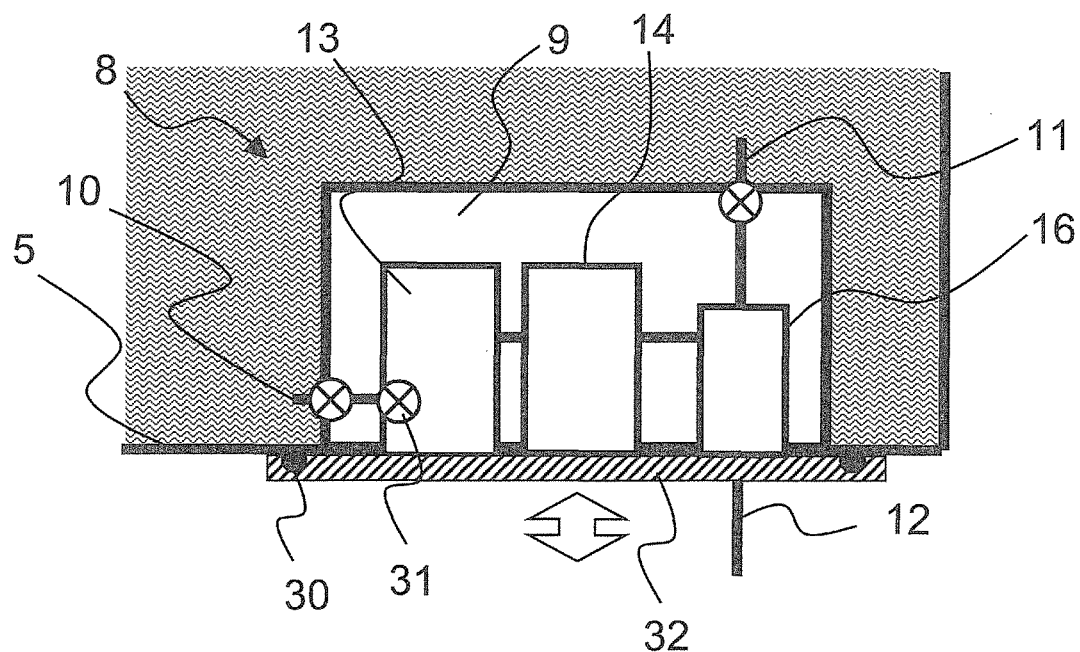
FIG. 4 is a fragmentary, vertical-sectional view of the apparatus having a maintenance-friendly configuration of components in the chamber.

FIG. 4 is intended to illustrate how such a chamber 9 can be constructed in order to make it possible to remove the delivery unit 8 in a particularly maintenance-friendly manner while a tank is at least partially filled. For this purpose, the components of the delivery unit 8 are disposed on a (separate, e.g. metal) base plate 32. The base plate 32 is (detachably) connected to the tank bottom 5 through suitable seals 30. The chamber walls, which are an integral part of the tank in this case, communicate with the tank interior through the discharge line 10 and the return line 11. Separate drain or discharge blocks or barriers 31 are provided in this case with regard to these two fluid lines. The separate drain blocks 31, which preferably close automatically when the base plate 32 with the filter 13, the pump 14 and the valve 16 is removed, thus prevent the liquid 2 from flowing out through the discharge line 10 and/or the return line 11. The drain blocks 31 can be operated mechanically or electrically.

In addition, it is also proposed herein to provide a corresponding blocking device close to the filter 13, in order to avoid an outflow of a partial volume of liquid located in the filter 13. This drain block 31 can be part of the filter or of the adjoining fluid line.

Figure 5:
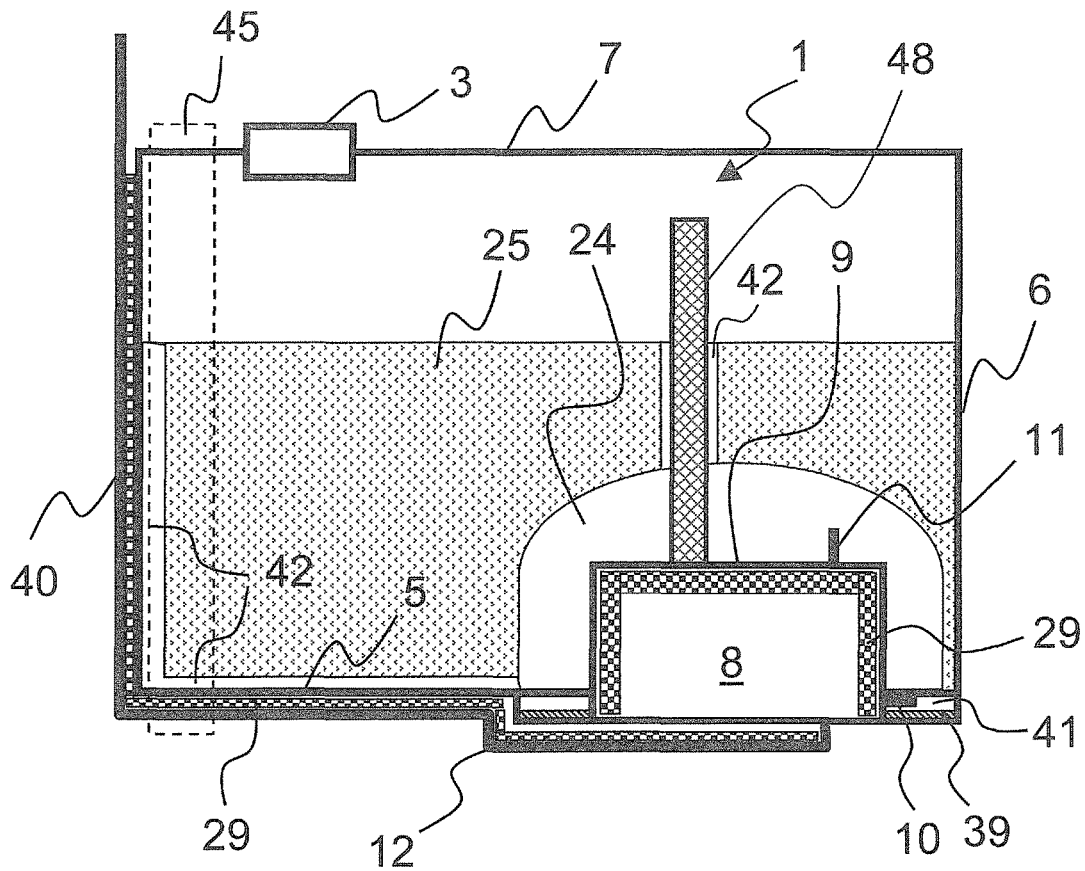
FIG. 5 is a vertical-sectional view of a further embodiment of the apparatus having a local ventilation heater.

FIG. 5 illustrates a further configuration of a tank 1 having a chamber 9 which is disposed close to the tank bottom 5 and in which a delivery unit 8 is disposed. The chamber 9 is embodied with a heater 29. Once again, it is shown therein that a frozen liquid 25 is located inside the tank 1. This frozen liquid 25 has been partially melted by the heater 29 in the chamber 9. As a particular feature of this tank 1, it can be emphasized in this case that a depression 41, which represents a kind of sump for thawed liquid, is formed around the chamber 9 on the tank bottom 5. This depression 41 is suitable to this extent, in particular, to extract the already thawed or melted liquid by suction through the discharge line 10. In order to also introduce the heat generated in the chamber 9 by way of the heater 29 into this depression 41 in this case, heat-conducting devices 39 are provided which extend into this depression 41 or into other regions of the tank bottom 5. These heat-conducting devices 39 can be in the form, for example, of metal webs, a metal ring and/or a metal sleeve, which are embedded on and/or in the tank bottom 5. In this exemplary embodiment, the heat-conducting devices 39 are part of the fastening device of the chamber 9.

This tank 1 has a local ventilation heater 40 in order to additionally avoid a vacuum from arising in the space 24 formed by the melting process. This local ventilation heater extends along the tank bottom 5, starting from the chamber 9 or the tank bottom close to the discharge line 10, and continuing along one tank side 6 as far as the vicinity of a tank top 7. The ventilation heater 40, which is embodied in a linear manner in this case, is formed with a heated injection line 12. The injection line 12, provided with the heater 29, extends in this case in contact with the tank wall, in such a way that a targeted channel 42 is melted by the introduction of heat through the heater 29 and the tank wall in the tank interior, so that the space 24 is connected to the space close to the tank top 7 or can communicate with this space.

Additionally, FIG. 5 illustrates yet another embodiment of a ventilation heater 40. A tank fastening device 45 for the tank 1 is indicated in FIG. 5. This tank fastening device 45 can optionally be configured in a heatable manner and therefore form a ventilation heater 40 which can melt free a specific channel 42. If appropriate, a ventilation heater 40 can also be formed by an (electrically heatable) conductor track printed on the tank wall.

An antenna 48 on the chamber 9 is depicted in FIG. 5 as a further embodiment of a ventilation heater 40. This antenna 48 extends over the height of the tank 1 and can have an active heater for melting open a specific channel 42. Alternatively or in addition, a heating tube or heat pipe can be provided in the antenna 48. The heating tube transports heat from the chamber 9 into the antenna 48 in order to form a specific channel 42.

Figure 6:
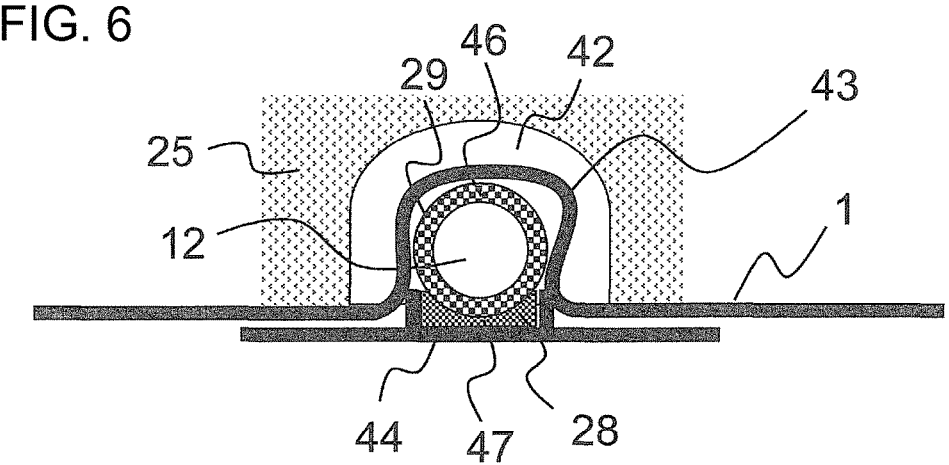
FIG. 6 is a fragmentary, cross-sectional view of an embodiment of a local ventilation heater.

FIG. 6 shows a cross section of a possible configuration of such a ventilation heater 40 with a heated injection line 12. To this end, the tank 1 is formed with a guide 43 into which, for example, the injection line 12 is introduced or can even be fixed. As a result of the action of the heater 29 around the injection line 12, the channel 42 is formed around the guide 43 in the interior of the tank 1. Insulation 28 is also provided in this case towards the outer side of the tank 1, for a directed heat effect of the heater 29. Thus, a first subregion 46 of the heated injection line 12, which is disposed on the tank 1, and a second subregion 47, which is directed away from the tank 1, are formed. Due to the thermal insulation 28, the second subregion 47 has a heat transfer coefficient which is lower than the heat transfer coefficient of the first subregion 46. As a result, heat is dissipated more into the tank 1 and less towards the outside, from the heated injection line 12.

The thermal insulation 28 is integrated into a cover 44, by way of which the guide 43 can be (releasably) closed. As a result, the injection line 12 is protected in this way.

Figure 7:
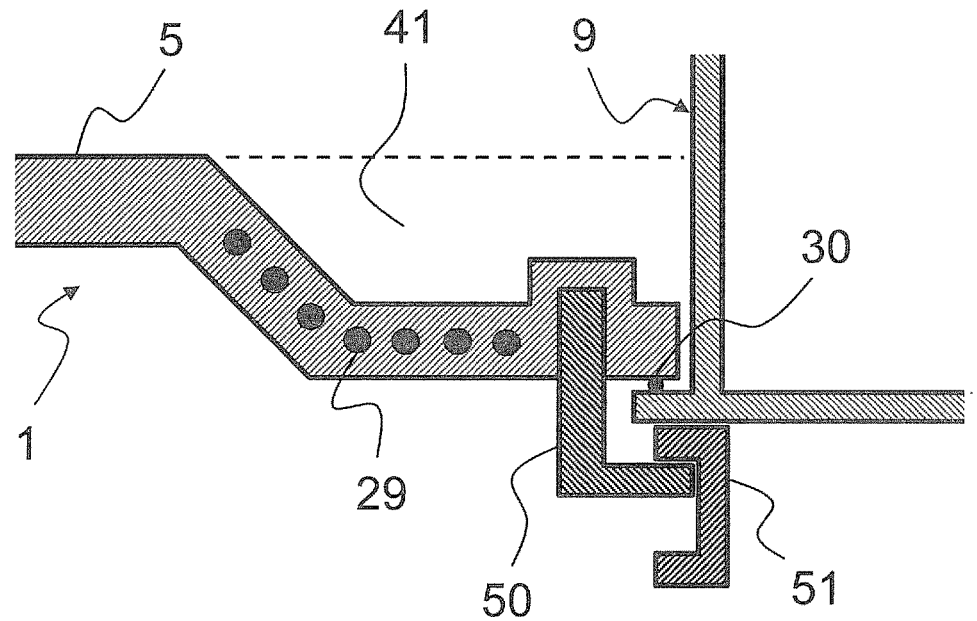
FIG. 7 is a further enlarged, vertical-sectional view of an embodiment of the apparatus having a special sump heater.
Figure 8:
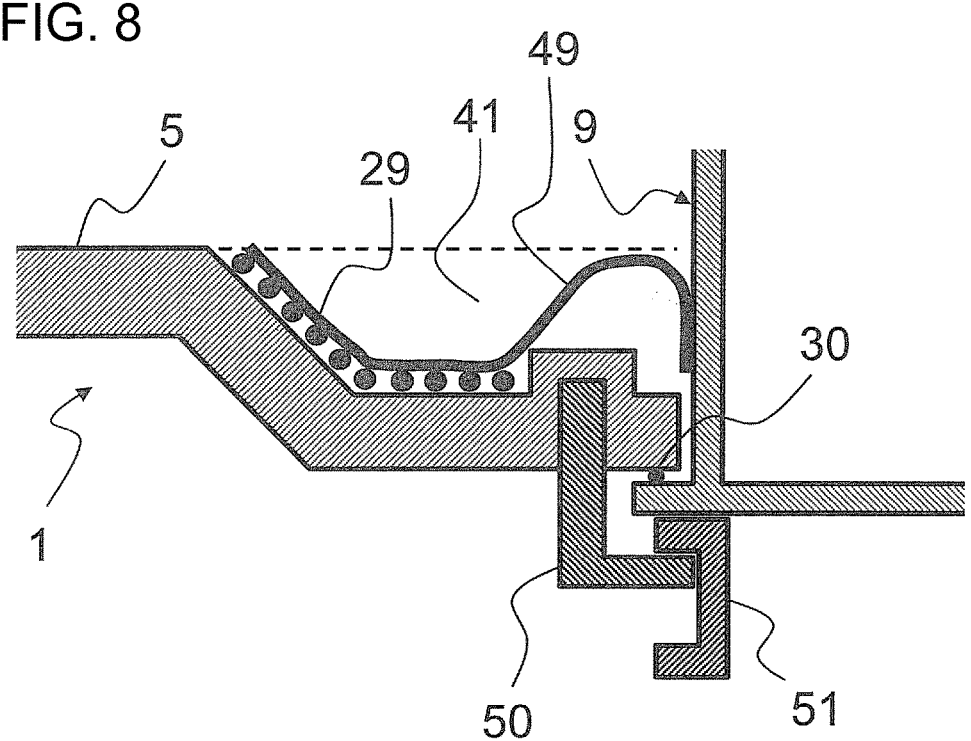
FIG. 8 is a fragmentary, vertical-sectional view of a further embodiment of the apparatus having a special sump heater.

FIG. 7 and FIG. 8 show two different portions of a tank 1 of an apparatus according to the invention. A portion of the tank bottom 5 having a sump-like depression 41 is shown in each case. A chamber 9 is inserted from below through an opening in the tank bottom 5 into this depression 41. The chamber 9 is sealed off from the tank bottom 5 by way of a seal 30. The seal 30 is configured in this case as an O-ring seal. In order to clamp the tank bottom 5, the seal 30 and the chamber 9 together, a holding element 50 is let into the tank bottom 5. The holding element 50 can, for example, be integrally cast in the tank bottom 5. An SAE screw connection 51 can act on the holding element 50 for the purpose of clamping.

According to the configuration of the tank 1 illustrated in FIG. 7, a heater 29 for the depression 41 is realized by heat conductors let into the tank bottom 5. The heat conductors can, for example, be a wire cloth or sheet metal strips. According to the configuration of the tank 1 selected in FIG. 8, a heater 29 for the depression 41 is pressed against the tank bottom 5 from the inside of the tank bottom 5. The heater 29 can also be configured in this case as a wire cloth or as sheet metal strips. The heater 29 can be pressed against the tank bottom 5 by way of a clamp 49. The clamp 49 and the heater 29 can be fastened to the chamber 9. Preferably, the heater 29 and the clamp 49 are configured in such a way that they can be inserted together with the chamber 9 into the opening in the tank bottom 5, without assembly within the tank 1 being necessary for this purpose.

For the sake of completeness, it should be noted that the structures of the chamber 9, the heater 29, the ventilation heater 40 and the drain blocks 31 that are illustrated individually in the figures separately represent an advantageous development of the known prior art and can, if appropriate, also be implemented independently of one another.

The invention claimed is:

1. An apparatus, comprising:
   at least one tank having a tank bottom;
   a chamber disposed on said tank bottom, said chamber being fluidically sealed with respect to said tank for keeping said chamber free of a liquid when the tank contains liquid therein, said chamber having at least one heater disposed therein; and
   a delivery unit for the liquid, the liquid being aqueous urea, said delivery unit disposed in said chamber.

2. The apparatus according to claim 1, wherein insulation is provided at least in vicinity of said top of said chamber.

3. The apparatus according to claim 1, wherein said at least one heater includes at least one self-regulating heating segment.

4. The apparatus according to claim 1, wherein said at least one heater is constructed as a filling level gauge.

5. The apparatus according to claim 1, which further comprises at least one heat-conducting device disposed on said tank bottom in vicinity of said chamber.

6. The apparatus according to claim 5, wherein said heat-conducting device serves to fasten said chamber.

7. The apparatus according to claim 1, which further comprises:
   a discharge line for liquid leading from said tank into said chamber; and
   a return line for liquid leading from said chamber into said tank;
   said discharge line and said return line disposed at different positions in said chamber.

8. The apparatus according to claim 7, wherein at least said discharge line or said return line has a drain block.

9. The apparatus according to claim 7, wherein said discharge line is placed at said tank bottom and the return line is placed at said top of said chamber.

10. The apparatus according to claim 1, wherein said at least one heater includes a plurality of heating segments which are self regulating independently from one another.

11. The apparatus according to claim 1, wherein said chamber has a chamber side wall and a chamber top, and said at least one heater has at least one electrical heating segment disposed in heat-conducting contact at least with said chamber side wall or said chamber top.

12. The apparatus according to claim 11, wherein said chamber has a height, and said at least one heater has a plurality of heating segments provided in direction of said height of said chamber.

13. The apparatus according to claim 1, wherein said at least one heater is at least one electrical heater.

14. The apparatus according to claim 13, wherein said at least one electrical heater is a heating foil.

15. The apparatus according to claim 1, wherein said chamber has a chamber side wall and said at least one heater is disposed on said side wall in heat-conducting contact at least with said chamber side wall.

16. The apparatus according to claim 1, wherein said chamber projects into said tank.

17. The apparatus according to claim 16, wherein said chamber has chamber side walls extending perpendicular to said tank bottom.

* * * * *

UNITED STATES PATENT AND TRADEMARK OFFICE
CERTIFICATE OF CORRECTION

PATENT NO. : 9,840,958 B2
APPLICATION NO. : 13/548607
DATED : December 12, 2017
INVENTOR(S) : Wolfgang Maus et al.

It is certified that error appears in the above-identified patent and that said Letters Patent is hereby corrected as shown below:

In the Drawings

Figures 3A and 3B on Sheet 3 of 6 should appear as shown on the attached sheet.

Signed and Sealed this
Eleventh Day of September, 2018

FIG. 3A
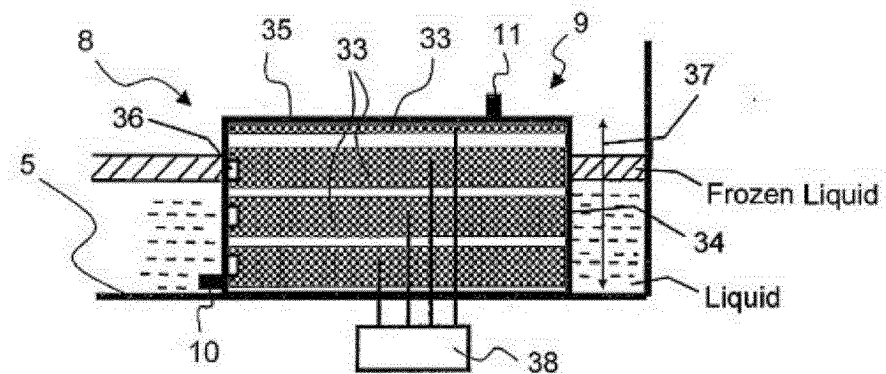
FIG. 3B
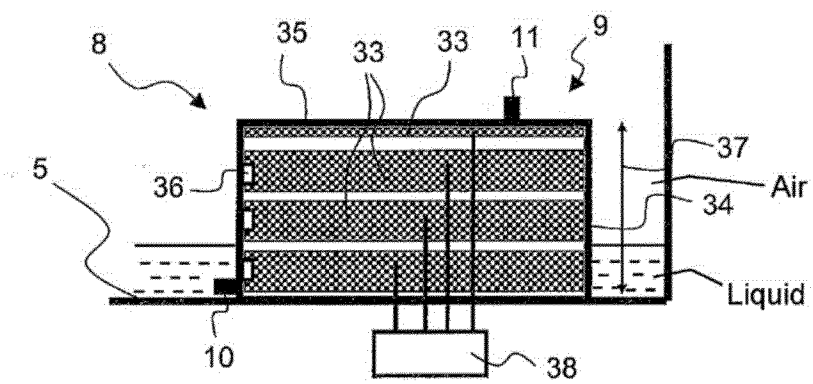

Andrei Iancu
*Director of the United States Patent and Trademark Office*